United States Patent
Lau et al.

(10) Patent No.: US 12,352,569 B2
(45) Date of Patent: Jul. 8, 2025

(54) BROADBAND PROFILER SYSTEM AND METHOD FOR CONSTRUCTING A THREE-DIMENSIONAL PROFILE OF A TARGET

(71) Applicant: AP Infosense Limited, Hong Kong (HK)

(72) Inventors: Kam Chiu Lau, Rockville, MD (US); Yongwoo Park, Rockville, MD (US); Po Shan Chan, Hong Kong (HK); Man Wai Cheng, Hong Kong (HK); Fei Yeung, Hong Kong (HK); Qi Lang, Hong Kong (HK)

(73) Assignee: AP Infosense Limited, Hong Kong (HK)

( * ) Notice: Subject to any disclaimer, the term of this patent is extended or adjusted under 35 U.S.C. 154(b) by 0 days.

(21) Appl. No.: 18/025,650

(22) PCT Filed: Jun. 2, 2022

(86) PCT No.: PCT/IB2022/055158
§ 371 (c)(1),
(2) Date: Mar. 10, 2023

(87) PCT Pub. No.: WO2023/084322
PCT Pub. Date: May 19, 2023

(65) Prior Publication Data
US 2024/0288261 A1    Aug. 29, 2024

(30) Foreign Application Priority Data
Nov. 12, 2021   (HK) .......................... 32021042425.7

(51) Int. Cl.
*G01B 9/02015*   (2022.01)
*G01B 9/02*   (2022.01)
(Continued)

(52) U.S. Cl.
CPC ..... *G01B 9/02015* (2013.01); *G01B 9/02064* (2013.01); *G01B 9/02065* (2013.01);
(Continued)

(58) Field of Classification Search
CPC ............ G01B 9/02015; G01B 9/02064; G01B 9/02083; G01B 9/02091; G01B 11/24; G01B 9/02065
See application file for complete search history.

(56) References Cited

U.S. PATENT DOCUMENTS 5,570,182 A * 10/1996 Nathel ................. A61B 5/0066
356/477
6,813,029 B1 * 11/2004 Lindner ............... G01B 11/303
356/497
(Continued)

FOREIGN PATENT DOCUMENTS

| CN | 102147240 A | 8/2011 |
| CN | 103344646 A | 10/2013 |
| CN | 108168425 A | 6/2018 |

*Primary Examiner* — Dominic J Bologna
(74) *Attorney, Agent, or Firm* — Idea Intellectual Limited; Margaret A. Burke; Sam T. Yip

(57) ABSTRACT

A three-dimensional profiler includes a broadband radiation source. An interferometric system receives the radiation and includes first and second beam splitters, a moving time delay-inducing reflector, and a stationary reflector. The interferometric system creates a time-delayed optical sample radiation source and an optical reference incident radiation source with the first beam splitter. A stationary sample holder receives the optical sample incident radiation. A reference plane receives the optical reference incident radiation. A detector receives an interference signal from reflected or scattered optical sample radiation and reflected or scattered optical reference radiation. A processor extracts an (Continued)

optical path difference between the reference plane and the sample and reconstructs a three-dimensional morphology of the sample.

8 Claims, 9 Drawing Sheets

(51) Int. Cl.
G01B 9/02055 (2022.01)
G01B 9/02091 (2022.01)
G01B 11/24 (2006.01)

(52) U.S. Cl.
CPC ..... G01B 9/02083 (2013.01); G01B 9/02091 (2013.01); G01B 11/24 (2013.01)

(56) References Cited

U.S. PATENT DOCUMENTS

| | | | |
|---|---|---|---|
| 2003/0042401 A1* | 3/2003 | Gartner | G01B 11/2545 250/208.1 |
| 2004/0012791 A1* | 1/2004 | Lega | G01B 9/02038 356/497 |
| 2005/0057756 A1* | 3/2005 | Fang-Yen | G01B 9/02057 356/497 |
| 2005/0134863 A1* | 6/2005 | De Lega | G01B 9/02039 356/512 |
| 2013/0107275 A1 | 5/2013 | Boccara et al. | |
| 2016/0039045 A1* | 2/2016 | Webster | G01B 9/02091 356/450 |
| 2017/0038191 A1* | 2/2017 | Arieli | G01B 9/02047 |
| 2018/0020912 A1 | 1/2018 | Bublitz et al. | |
| 2019/0350459 A1* | 11/2019 | Hong | G01B 9/02072 |
| 2020/0103215 A1* | 4/2020 | Frisken | A61B 3/0025 |
| 2020/0208958 A1* | 7/2020 | Chiang | G01B 9/0209 |

* cited by examiner

BROADBAND PROFILER SYSTEM AND METHOD FOR CONSTRUCTING A THREE-DIMENSIONAL PROFILE OF A TARGET

FIELD OF THE INVENTION

The present invention provides a non-invasive, non-contact and label-free apparatus and method to acquire a three-dimensional profile of an object which, in one embodiment, may be a translucent micro-object (e.g., living cell).

BACKGROUND

Interferometry is a widely-used technique for measuring various properties of a target sample. Interferometers use the principles behind interference, in which light or other electromagnetic waves are superimposed with one another; the resulting interference is analyzed to extract sample properties. In an interferometer, source light is split into two optical paths, with one path directed towards a sample and the other path directed at a reference element. Reflected or scattered light is combined and sent to a detector. Interference fringes provide information regarding a difference in optical path length between the sample light and the reference light which can be related to properties such as surface features of a sample.

While interferometry may be used in a wide variety of technical disciplines, its use may be limited when analyzing biological samples. Biological samples, such as translucent living cells, may often be immersed in liquid and require measurement/imaging through this liquid. Conventional interferometers may not be able to determine the optical path difference between the sample and the reference arms due to the presence of this liquid or the presence of a multilayer sample.

Other techniques may be used for determining three-dimensional properties of an object. However, techniques such as scanning electron microscopy, require time-consuming and expensive sample preparation and occur in a vacuum environment. Other techniques, such as cell staining, kill the sample and thus cannot be used to observe real-time cellular functions such as cell division.

Thus, there is a need in the art for improved interferometers and methods that can effectively measure multilayer profiles of samples, including biological samples, in a non-destructive manner with little sample preparation. The present invention addresses this need.

SUMMARY OF THE INVENTION

The present invention is capable of providing a three-dimensional profile of a multilayer sample such as a biological sample immersed in liquid. The invention accomplishes this by using a time-delayed light in the source arm. In this manner, vibration and motion of an objective lens or sample are eliminated and a living sample and its fluid surrounding will not be subject to movement.

In one aspect, the present invention provides an optical system for reconstructing the morphology of a sample, which, in one embodiment, may be a translucent biological micro-sample. The system includes a broadband radiation source and, optionally, a first lens system communicating with the radiation source and outputting a collimated radiation beam. An interferometric system is configured to receive the collimated radiation beam and includes at least a first beam splitter, a moving time delay-inducing reflector, and a stationary reflector. The interferometric system creates a time-delayed optical sample incident radiation source and an optical reference incident radiation source with the first beam splitter. A stationary sample holder receives the optical sample incident radiation. A reference plane receives the optical reference incident radiation. A detector receives an interference signal from reflected or scattered optical sample radiation and reflected or scattered optical reference radiation. A processor extracts an optical path difference between the reference plane and the sample and reconstructs a three-dimensional morphology of the sample.

DETAILED DESCRIPTION

Figure 1A:
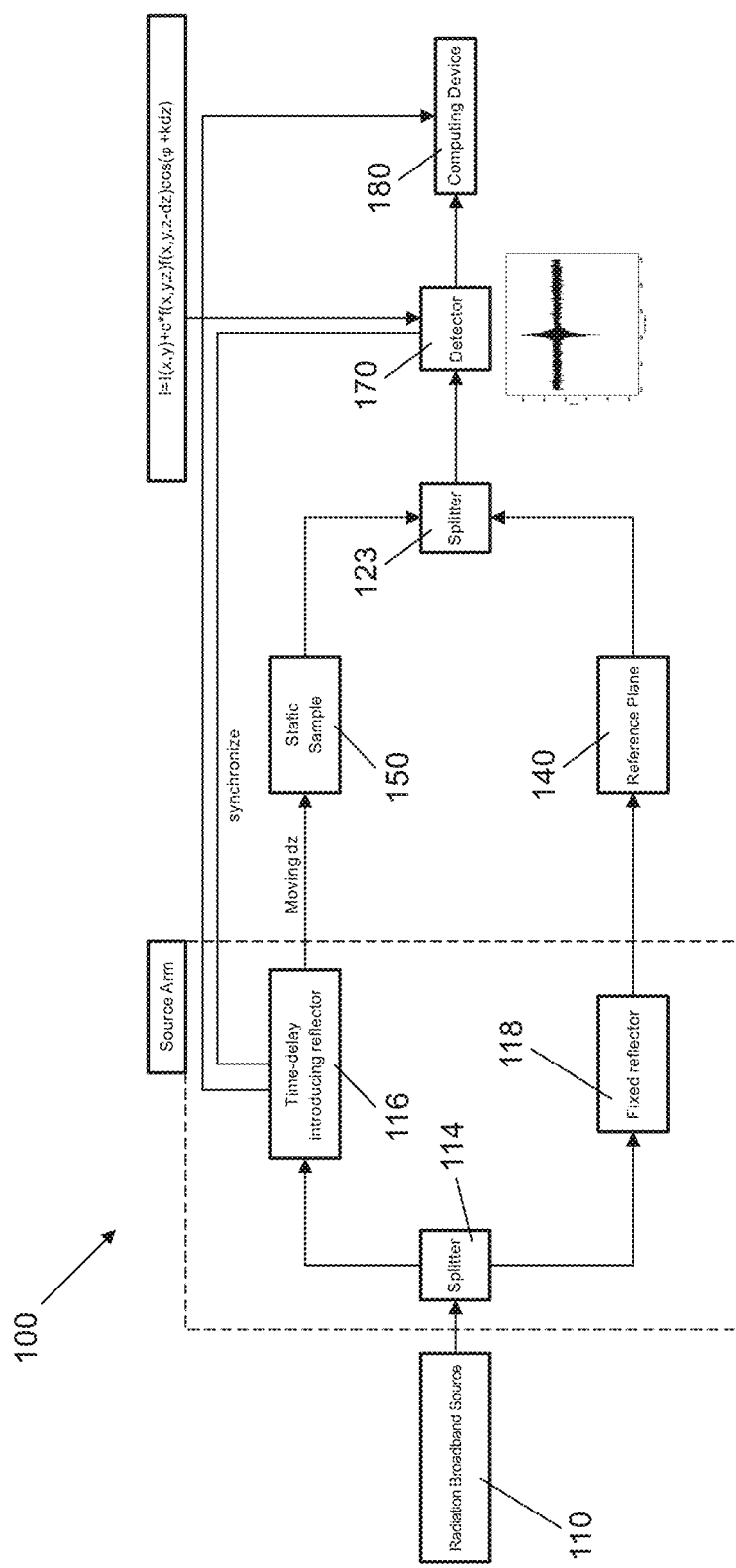
FIGS. 1A-1B schematically depict an overview of an optical system and an optical system according to a first embodiment.

Turning to the drawings in detail, FIG. 1A schematically depicts the major components of an optical system 100 according to an embodiment. In one aspect, the invention compensates for an increase in focal distance caused by the presence of liquid in a sample to be measured by employing time-delayed light in the sample-measuring path of the optical system. The optical system 100 may be used for reconstructing the morphology of a three-dimensional sample; in one embodiment, this may be a translucent micro-sample.

System 100 includes an electromagnetic radiation source 110 which may be, for example, light, UV, infrared, etc. A splitter 114 splits the light towards movable reflector 116, which introduces a time delay, and a fixed reflector 118. Time-delayed light is incident on a sample 150 which, in one embodiment, may be a stationary sample including a liquid. Light from the fixed reflector is incident on a reference plane 140. An interference image with the two copies of the sample and the reference reflected light enters the detector 170 and can be modeled as:

$$I = I(x, y) + c * f(x, y, z) f(x, y, z - dz) \cos(\varphi + kdz)$$

Figure 1B:
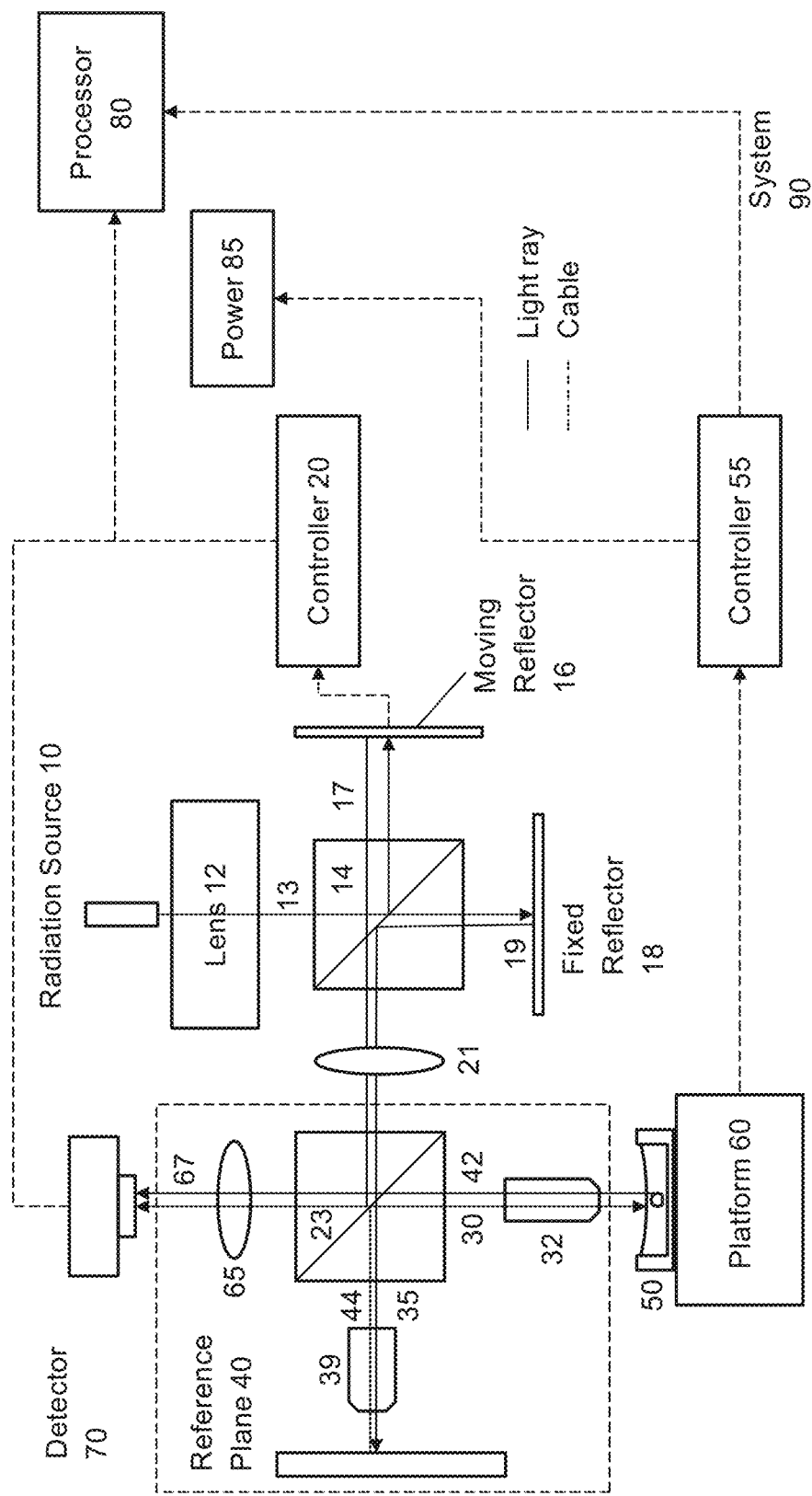

FIG. 1B presents a more detailed depiction of an optical system 90 according to an embodiment. System 90 uses a broadband electromagnetic radiation source 10. In one aspect, broadband electromagnetic radiation source 10 may be a broadband light source that emits a continuous spectrum of light. This light may be white light, for example, from a white light LED or halogen source, or it may use other spectral regions of electromagnetic radiation such as ultraviolet or infrared. The light enters optional lens 12, for example, a collimating lens, to product collimated incident light 13.

The collimated light 13 enters the first beam splitter 14 which transmits half the light towards fixed/stationary mirror 18 and reflects half the light toward a moving reflector 16. The moving reflector induces a time delay through motion in a direction normal to the reflector surface. In one aspect, moving reflector 16 may be a piezoelectric mirror 16. The piezoelectric mirror 16, under the direction of mirror controller 20, introduces a controlled time-delayed component into a reflected beam 17.

In contrast, the light 19 reflected by the stationary reflector 18 does not include a time delay. The two light copies are prepared for making coherent correlation of colinearly overlapped images. These reflected beams are directed towards a second optical beam splitter 23 by the first optical beam splitter 14 after passing through an optical lens 21.

In the second optical beam splitter 23, the light is transmitted/reflected into optical beams 30, the optical sample beam, and optical beam 35, the optical reference beam. Each of these beams passes through respective objective lenses 32 and 39. The optical sample beam is incident on the sample 50 positioned on stationary platform/stage 60 while the optical reference beam is incident on the reference plane 40. Reference plane 40 may be a partially-reflective plate that is located at the focal plane of the objective lens 39.

Note that the light incident on the sample is sufficient for imaging the entire area of the sample though a tomographic technique in which light is incident at various thicknesses of the sample. Thus, an entire x–y image at a thickness z will be captured from the light reflected/scattered by the sample. However, it is also possible to produce a more focused beam of light that is raster-scanned across the surface of the sample, although this is not used in the system of FIG. 1B. The sample rests on a sample platform 60 which, for biological samples immersed in liquid, may include a sample holder that is watertight such as a culture plate. A controller 55 is capable of accurately positioned sample platform 60 to ensure optical alignment.

Light is reflected/scattered by the sample 50 and is combined with light reflected/scattered by the reference plane 40 in the second beam splitter 23 to create an interference light signal 67 that is directed to detector 70 via optional lens 65. The detector may be one or more charge-coupled devices (CCD), a camera, or any other known detector (for example, a UV or IR detector when the source is UV or IR). To create a fully three-dimensional image, a tomographic technique is used in which sequential thickness of the sample are imaged. As used herein, the term "tomography" is broadly used to denote any kind of imaging by sections in a z-direction of the sample (that is, perpendicular to the incident source) by an incident electromagnetic source radiation (e.g., light, infrared or UV).

In order to image through the thickness of the sample, successive images in the x-y plane are captured at different depths of incident light (z-direction). The light is made incident at different thicknesses by repositioning moving reflector 16 at different positions in the z-direction (that is, the direction perpendicular to the incident light).

A processor 80 extracts an optical path difference between the reference plane and the sample and reconstructs an image for each thickness imaged; due to the low coherence of the light (from using a broadband light source), only a relatively thin depth can produce an interference signal. Combining all of the x–y images throughout the thickness of the sample recreates the three-dimensional morphology of the sample through tomographic image reconstruction. Both the phase and intensity of the light in each pixel is determined.

The light fringe indicates the phase difference between the sample and reference plate; by applying the numerical calculation to locate the signal position, the optical path difference between the sample surface and reference plane will be extracted, the tomographic phase and intensity information can be extracted layer by layer, and finally the three-dimensional cell morphology shape can be reconstructed.

The reflected image may be expressed in terms of a 3D reflectivity profile f(x,y,z). An interference image with the two copies of the sample and the reference reflected light can be modeled as:

$$I = I(x, y) + c * f(x, y, z)f(x, y, z - dz)\cos(\varphi + kdz)$$

where the first term is the background image that is invariant to the scanning, and the second term is the modulated image by the low-coherence interference. As the delay is scanned, the image varies as an autocorrelation of the three-dimensional reflectivity.

The f(x,y,z–dz) can be obtained if the image is acquired synchronously with a quarter wave step delay. The quarter wave delay is made by moving the piezoelectric-mounted mirror.

$$I_1(x, y) = I + c * f0 * f(x, y, z) * \cos[\varphi(x, y)] \qquad \varphi'(z) = 0 \ (0°)$$
$$I_2(x, y) = I - c * f0 * f(x, y, z-\lambda/4) * \sin[\varphi(x, y)] \qquad = \pi/2 \ (90°)$$
$$I_3(x, y) = I - c * f0 * f(x, y, z-2\lambda/4) * \cos[\varphi(x, y)] \qquad = \pi \ (180°)$$
$$I_4(x, y) = I + c * f0 * f(x, y, z-3\lambda/4) * \sin[\varphi(x, y)] \qquad = 3\pi/2 (270°)$$
$$\text{Then} = f(x, y, z) = \sqrt{(I1(x, y) - I3(x, y))^2 + (I4(x, y) - I2(x, y))^2}/2$$

$$(x, y, z) = \tan^{-1}[(I_4(x, y) - I_2(x, y))/(I_1(x, y) - I_3(x, y))].$$

Here f(x,y,x) is assumed to be invariant within a wavelength delay.

Figure 4:
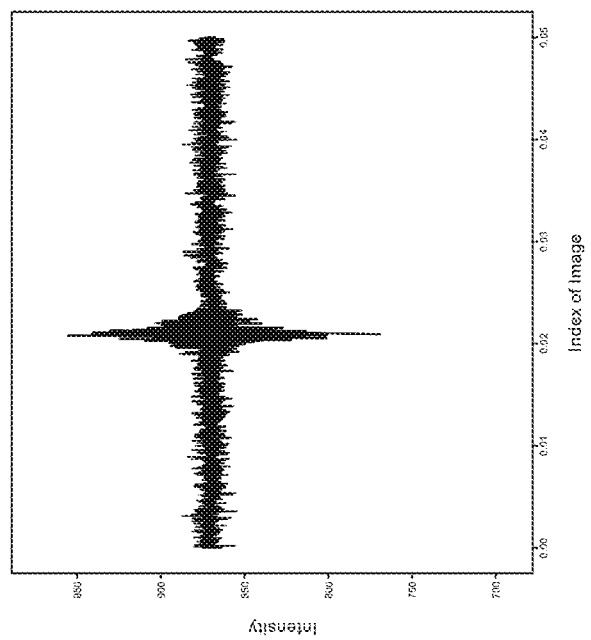
FIG. 4 is a plot of a signal peak produced by the system of FIG. 1.

The intensity change due to the quarter wave step delay may be represented as the fringe showing on the image. The image is captured by the detector 70. The intensity change for each pixel is shown in FIG. 4.

For an image in the x-y plane, the irradiance at each pixel is registered. The best fringe localization position of each pixel is determined by a series of pre-processing, processing, and post-processing of the images. In the pre-processing stage, image filtering algorithms are applied in order to minimize the effects of dispersion imbalance, phase change and system vibration with the system. Image enhancement algorithms are also applied according to samples' properties. The above algorithms benefit from the high resolution power in the axial scan and "over-resolution" in the lateral scan.

In the processing stage, a fast envelope and peak detection algorithm is applied to determine the surface and possible multi-layer properties. After that, the individual fringe localization position is analyzed with regard to the sample properties by various methods, such as frequency domain analysis, phase change detection and time domain filtering.

Figure 5:
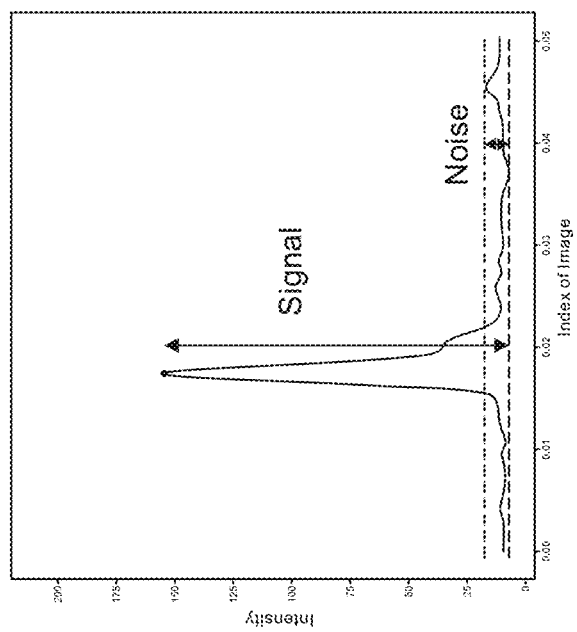
FIG. 5 is a depiction of the peak intensity information extracted from the plot of FIG. 4.

The process is accelerated by Compute Unified Device Architecture (CUDA), so that the processing time is compressed. An example of a processed image showing a signal peak extending above noise is shown in FIG. 5. At a later stage, the point cloud generated by the above techniques, with each point being a signal peak such as that shown in FIG. 5, is analyzed by various methods, such as clustering and segmentation.

Clustering algorithms are a form of unsupervised machine learning. Data is partitioned into subgroups based on a learned similarity among data points. Each data point in a cluster is more similar to other data points within that cluster than it is to data points falling within different clusters. Segmentation groups points in subsets/segments that have one or more characteristics in common. The similarity among data points is highly dependent on the particular sample being analyzed and thus the learning may take into account the type of sample (e.g., biological sample, inorganic sample, semiconductor device, etc.).

Figure 6:
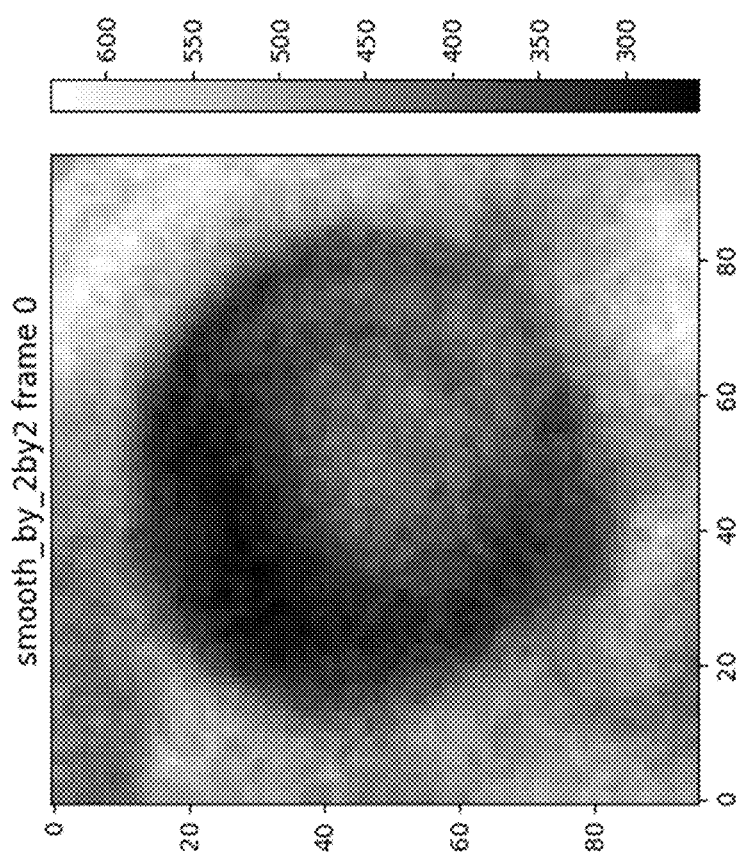
FIG. 6 is a red blood cell image produced by the optical system of FIG. 1

A density-based clustering algorithm may be selected for clustering. Density-based algorithms may be used when there are many points together that are concentrated (e.g., a cell features such as a nucleus) surrounded by areas without features such as predominantly fluid-based protoplasm areas). One such algorithm that may be used is a density-based spatial clustering of applications with noise (DB-SCAN) that is useful to reduce noise from the data. Other algorithms based on the DBSCAN approach may also be used. In the post-processing stage, the point cloud is processed, and clustering and segmentation information are processed together to render an accurate three-dimensional morphology. Various tools are provided for surface inspection, roughness measurement, and visualization. An example of a three-dimensional morphology produced is the red blood cell image of FIG. 6.

Figure 2:
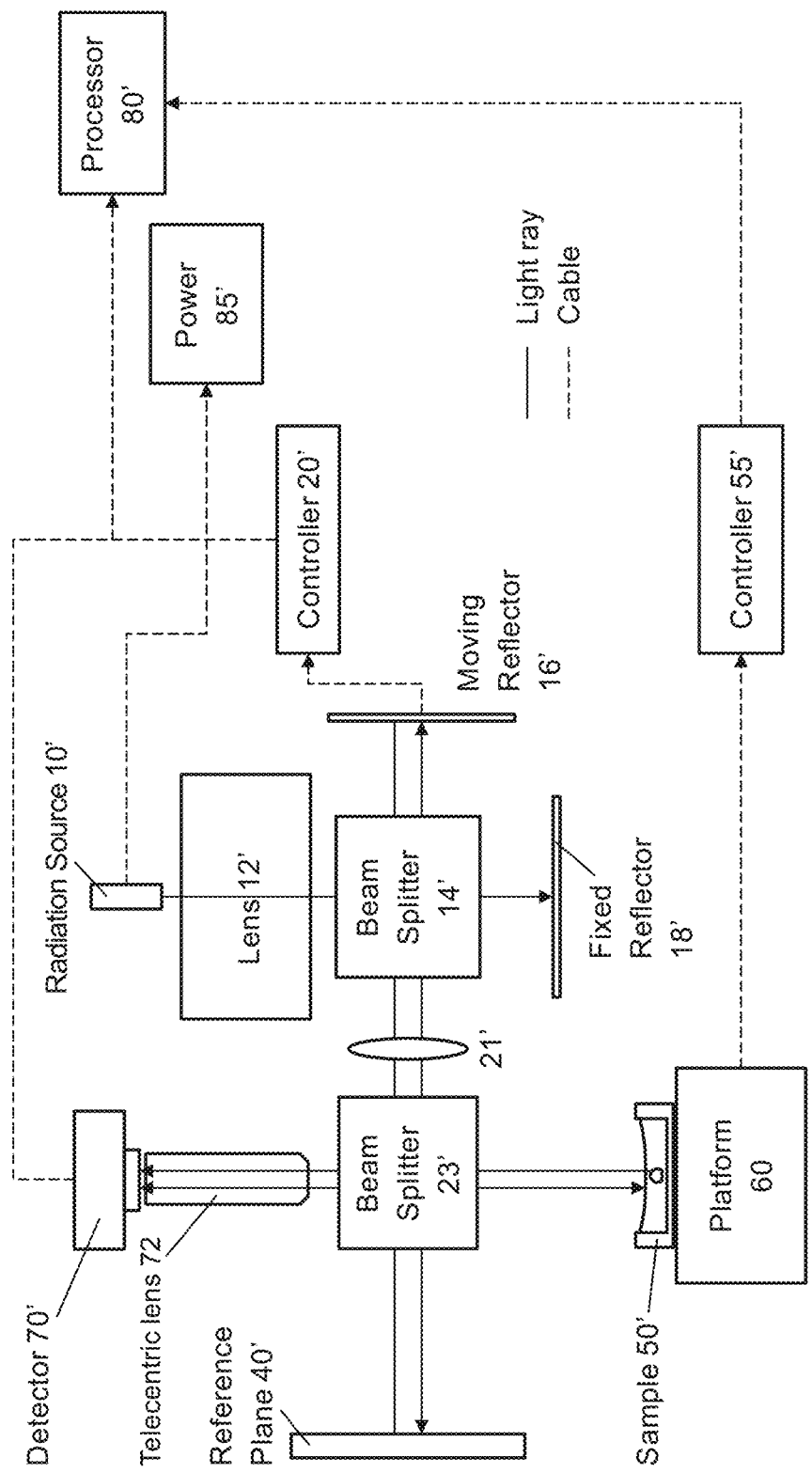
FIG. 2 is an optical system according to a further embodiment.

A further embodiment of an optical system is depicted in FIG. 2. In the embodiment of FIG. 2, elements that may be substantially similar to the elements of FIG. 1B are indicated by the same reference numerals. In the embodiment of FIG. 2, radiation from radiation source 10' enters collimating lens 12' followed by beam splitter 14'. The combined reflected/scattered light from the sample and the reference plane passes through telecentric lens 72 prior to entering detector 70'.

Figure 3:
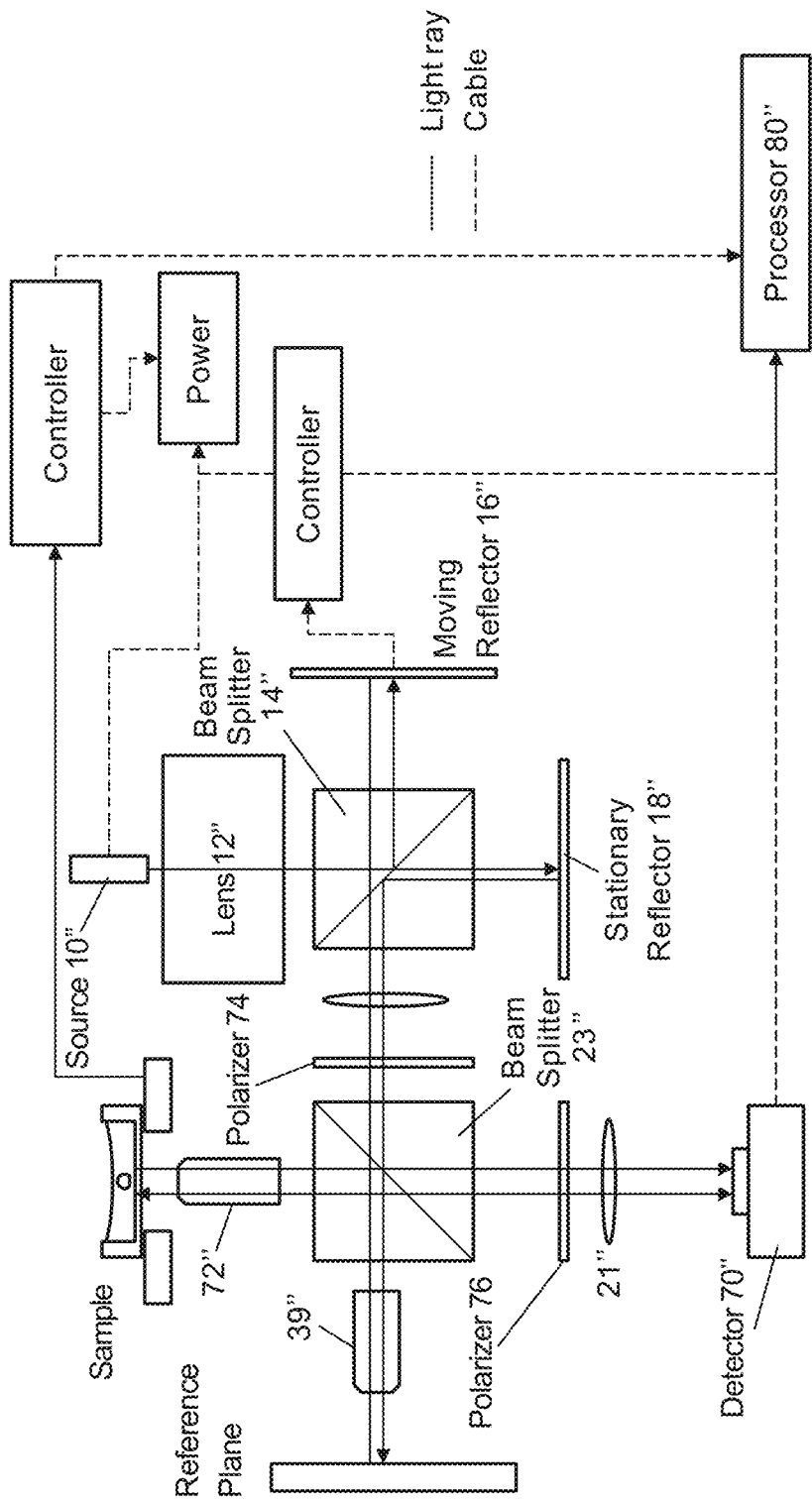
FIG. 3 is an optical system according to a further embodiment.

An embodiment of an optical system is depicted in FIG. 3. In the embodiment of FIG. 3, elements that may be substantially similar to the elements of FIG. 1B are indicated by the same reference numerals. In the system of FIG. 3, radiation is incident on a reverse side of the sample. Further, polarizers 74 and 76 are used such that polarized light enters detector 70". The use of polarized light enhances contrast and thus increases the quality of the resultant three-dimensional image created. When the sample is a biological sample in a liquid such as water, the use of polarized light reduces undesirable reflection from the water surface.

INDUSTRIAL APPLICABILITY

The present invention may be used to observe see three-dimensional cell structures, for example, the nucleus or other organelles. In general, if different proteins have different refractive indices the structures may be observed. Such biological samples should be translucent or transparent to obtain the three-dimensional imaging. Little sample preparation is required and the sample may be a living sample to observe cell activity such as cell division. Applications include pathology, cancer detection and research, observation of topology changes of cell samples.

Because the technique does not require extensive sample preparation and is non-destructive, it may be used for non-destructive evaluation of structures, including crack detection and other defects. It may also serve as a final inspection tool in areas such as semiconductor device production.

Figure 7B:
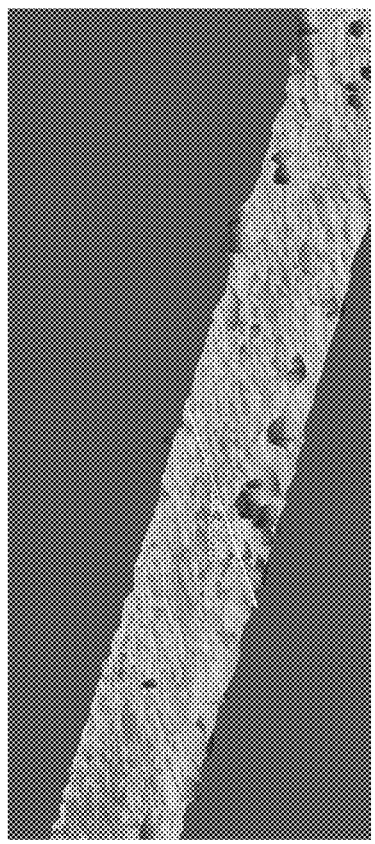
FIGS. 7A-7D show images of a variety of samples that may be observed/inspected using the optical systems of the present invention.
Figure 7A:
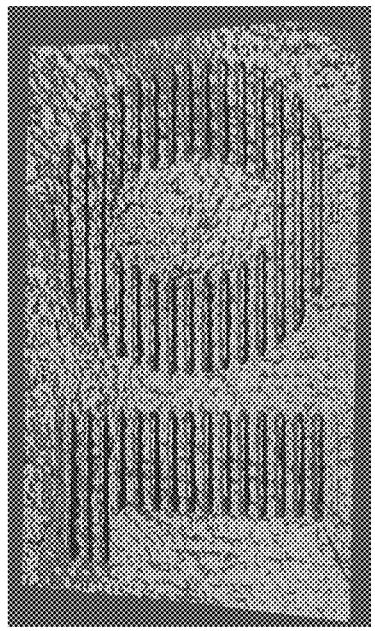
Figure 7D:
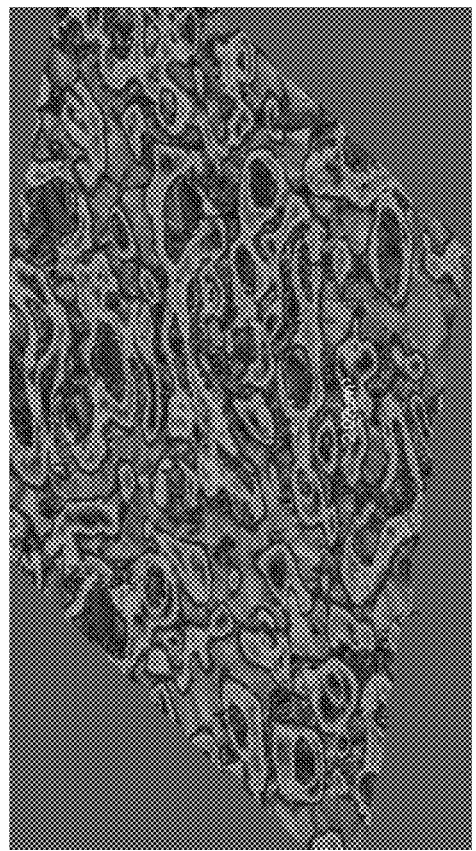
Figure 7C:
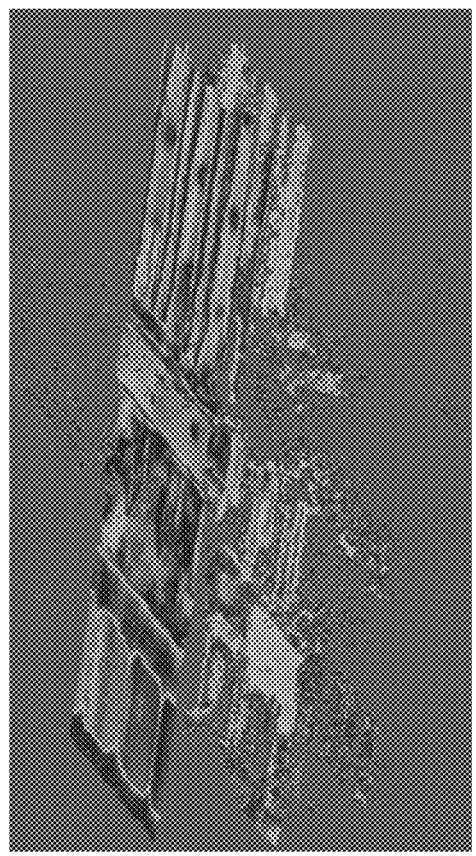

FIGS. 7A-7D show images of a variety of samples that may be observed/inspected for quality control or other purposes. FIG. 7A is an image of ink on bank note which can show if there are any printing defects in the printing process. FIG. 7B is an image of a human hair. FIG. 7C is an image of a line sensor, showing the invention used in device inspection. FIG. 7D shows inspection of a spray coating using the present invention which can be used for determining coating uniformity. While the images are reproduced in black and white, it is understood that the present system may be used to produce color images.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. An optical system for reconstructing a three-dimensional morphology of a sample, the system comprising:
a broadband radiation source;
an interferometric system configured to receive the radiation from the broadband radiation source, wherein the interferometric system comprises:
a first beam splitter, a moving time delay-inducing reflector, and a stationary reflector, wherein the radiation is directed to the first beam splitter, and wherein the first beam splitter transmits half of the radiation to the stationary reflector, creating an optical reference incident radiation, and reflects half of the radiation to the moving time delay- inducing reflector, creating a time-delayed optical sample incident radiation; and
a second beam splitter receiving the optical reference incident radiation and the time-delayed optical sample incident radiation;
a stationary sample holder for receiving the time-delayed optical sample incident radiation reflected from the second beam splitter, resulting in reflected or scattered optical sample radiation, wherein the second beam splitter further receives reflected or scattered optical sample radiation from the stationary sample holder;
a reference plane for receiving the optical reference incident radiation which passes through the second beam splitter, resulting in reflected or scattered optical reference radiation, wherein the second beam splitter further receives reflected or scattered optical reference radiation from the reference plane, and wherein a first optical path between the second beam splitter and the stationary sample holder is spatially separated from a second optical path between the second beam splitter and the reference plane;

a detector configured to receive an interference signal generated by the second beam splitter from the reflected or scattered optical sample radiation and the reflected or scattered optical reference radiation; and a processor for extracting an optical path difference between the reference plane and the sample and generating a three-dimensional morphology of the sample;

the processor generating an x-y plane image for each sample z-direction thickness, the irradiance for each pixel in the x-y plane image being registered and a fringe localization position of that pixel being determined by a series of pre-processing, processing, and post-processing stages, wherein in the pre-processing stage, image filtering algorithms are applied to minimize dispersion imbalance, phase change and system vibration with the system, in the processing stage, a fast envelope and peak detection algorithm is applied to determine a surface and multilayer properties in which a generated point cloud is analyzed by clustering and segmentation machine learning to group points having common characteristics and to denoise each x-y plane image and wherein plural generated x-y plane images are combined in the z-direction to create the three-dimensional morphology of the sample.

2. The optical system of claim 1, wherein the reconstructing includes extracting tomographic phase and intensity of the generated x-y plane images of the sample.

3. The optical system of claim 1, wherein the movable reflector includes a piezoelectric mirror.

4. The optical system of claim 1, further comprising a first polarizer positioned to create a polarized optical sample incident radiation source and polarized optical reference incident radiation source, and a second polarizer positioned to direct polarized radiation to the detector.

5. The optical system of claim 1, further comprising a collimating lens positioned between the broadband electromagnetic radiation source and the first beam splitter.

6. A method for reconstructing a three-dimensional profile of a sample, the method comprising:

directing broadband radiation to an interferometer including a first beam splitter, a second beam splitter, a moving time delay-inducing reflector, and a stationary reflector, wherein the broadband radiation is directed to the first beam splitter which transmits half of the broadband radiation toward the stationary reflector, creating an optical reference incident radiation, and reflects half of the broadband radiation toward the moving time delay-inducing reflector, creating a time-delayed optical sample incident radiation;

receiving the optical reference incident radiation and the time-delayed optical sample incident radiation by the second beam splitter;

directing, by using the second beam splitter, the time-delayed optical sample incident radiation to a stationary sample and directing the optical reference incident radiation to a reference plane, wherein the second beam splitter reflects the time-delayed optical sample incident radiation to the stationary sample, and the second beam splitter allows the optical reference incident radiation to pass therethrough to reach the reference plane, and wherein a first optical path between the second beam splitter and the stationary sample is spatially separated from a second optical path between the second beam splitter and the reference plane;

combining, in the second beam splitter, reflected or scattered optical sample radiation from the stationary sample and reflected or scattered optical reference radiation from the reference plane and directing combined radiation to a detector;

extracting an optical path difference from a radiation fringe indicating a phase difference between the sample and a reference plane; and generating a three-dimensional morphology of the sample based on the optical path difference though sequential tomographic imaging of the sample;

wherein generating the three-dimensional sample morphology includes generating an x-y plane image for each sample z-direction thickness, the irradiance for each pixel in the x-y plane image being registered and a fringe localization position of that pixel being determined by a series of pre-processing, processing, and post-processing stages, wherein in the pre-processing stage, image filtering algorithms are applied to minimize dispersion imbalance, phase change and system vibration with the system, in the processing stage, a fast envelope and peak detection algorithm is applied to determine a surface and multilayer properties in which a generated point cloud is analyzed by clustering and segmentation machine learning to group points having common characteristics and to denoise each x-y plane image and wherein plural generated x-y plane images are combined in the z-direction to create the three-dimensional morphology of the sample.

7. The method of claim 6, wherein the sequential imaging of the sample is performed by repositioning the moving reflector to different positions such that the time-delayed optical sample incident radiation is incident at different thicknesses of the sample.

8. The method of claim 6, wherein the sample is immersed in a liquid.

* * * * *